United States Patent
Lakemond

(10) Patent No.: US 9,842,386 B2
(45) Date of Patent: Dec. 12, 2017

(54) IMAGE FILTERING BASED ON IMAGE GRADIENTS

(71) Applicant: Imagination Technologies Limited, Kings Langley (GB)

(72) Inventor: Ruan Lakemond, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/084,720

(22) Filed: Mar. 30, 2016

(65) Prior Publication Data

US 2016/0292837 A1 Oct. 6, 2016

(30) Foreign Application Priority Data

Mar. 30, 2015 (GB) .................................. 1505446.3

(51) Int. Cl.

| G06K 9/40 | (2006.01) |
|---|---|
| G03B 7/00 | (2014.01) |
| G06T 5/20 | (2006.01) |
| G06T 5/00 | (2006.01) |
| G06T 11/60 | (2006.01) |

(52) U.S. Cl.
CPC ................ *G06T 5/20* (2013.01); *G06T 5/002* (2013.01); *G06T 5/007* (2013.01); *G06T 11/60* (2013.01); *G06T 2207/20208* (2013.01)

(58) Field of Classification Search
CPC . G06T 5/20; G06T 5/002; G06T 11/60; G06T 5/007; G06T 2207/20208
USPC ....... 382/106, 128, 260, 265, 254, 237, 219, 382/181, 190, 173, 168, 169; 348/362, 348/165, 241, 739, 744, 759, 760, 761; 716/50; 345/77; 358/443, 448
See application file for complete search history.

(56) References Cited

U.S. PATENT DOCUMENTS 5,959,693 A 9/1999 Wu et al.
7,280,703 B2 * 10/2007 Gallagher ............... G06T 5/004
382/260

(Continued)

FOREIGN PATENT DOCUMENTS

| WO | 02/078319 A2 | 10/2002 |
| WO | 2012/110894 A1 | 8/2012 |

OTHER PUBLICATIONS

Sharma, et al., "Asymptotic Analysis of Stochastic Gradient-Based Adaptive Filtering Algorithms with General Cost Functions", IEEE Transactions on Signal Processing, vol. 44, No. 9, pp. 2186-2194, Sep. 1996.

(Continued)

*Primary Examiner* — Sheela C Chawan
(74) *Attorney, Agent, or Firm* — Vorys, Sater, Seymour and Pease LLP; Vincent M DeLuca

(57) ABSTRACT

Image processing methods and systems apply filtering operations to images, wherein the filtering operations use filter costs which are based on image gradients in the images. In this way, image data is filtered for image regions in dependence upon the image gradients for the image regions. This may be useful for different scenarios such as when combining images to form a High Dynamic Range (HDR) image. The filtering operations may be used as part of a connectivity unit which determines connected image regions, and/or the filtering operations may be used as part of a blending unit which blends two or more images together to form a blended image.

20 Claims, 9 Drawing Sheets

(56) References Cited

U.S. PATENT DOCUMENTS

| | | | | |
|---|---|---|---|---|
| 7,295,716 | B1* | 11/2007 | Chinen | G06T 5/009 345/77 |
| 8,010,913 | B2* | 8/2011 | Poonawala | G06F 17/5081 716/50 |
| 8,340,378 | B2* | 12/2012 | Knapp | G06T 7/12 382/128 |
| 8,724,921 | B2* | 5/2014 | Jin | G03B 7/00 348/362 |
| 9,117,134 | B1 | 8/2015 | Geiss et al. | |
| 9,245,328 | B2* | 1/2016 | Tezaur | G06T 5/003 |
| 9,451,183 | B2* | 9/2016 | Hogasten | H04N 5/2257 |
| 2004/0096103 | A1 | 5/2004 | Gallagher et al. | |
| 2005/0094003 | A1 | 5/2005 | Thorell | |
| 2009/0034868 | A1 | 2/2009 | Rempel et al. | |
| 2013/0223690 | A1* | 8/2013 | Criminisi | G06T 5/008 382/106 |
| 2013/0329071 | A1 | 12/2013 | Doepke et al. | |
| 2014/0247365 | A1* | 9/2014 | Gardner | H04N 5/21 348/165 |
| 2016/0180504 | A1* | 6/2016 | Kounavis | G06T 5/002 348/241 |

OTHER PUBLICATIONS

The extended European Search Report for European Application No. 16153695.8, dated Aug. 29, 2016, twelve pages.

* cited by examiner

IMAGE FILTERING BASED ON IMAGE GRADIENTS

BACKGROUND

Cameras are used to capture images. One of the fundamental limitations to the light sensors in digital cameras is their limited dynamic range, which describes the ratio between the minimum and maximum light intensities that are detectable by the light sensors. While quantisation plays a significant role in the achievable dynamic range, the limitations are often mainly physical in nature. The minimum detectable light intensity is dependent upon sensor element size, efficiency and the noise floor. Individual pixels are often extremely small in compact devices, resulting in a low likelihood of capturing a photon in low light conditions and high susceptibility to interference from various noise sources and neighbouring pixels. The maximum detectable light intensity may be determined by the maximum amount of charge that a sensor element can generate from light, which may lead to a saturation effect. The exposure level of an image can be adjusted, e.g. by adjusting the exposure time, aperture size or sensor sensitivity. The exposure level of an image may be adjusted to suit lighting conditions of a scene of which an image is to be captured, e.g. for a dark scene the exposure level may be increased, whilst for a bright scene the exposure level may be decreased. Adjusting the exposure level between images allows for a wider operating range, but does not affect the dynamic range of a single exposure or image.

High Dynamic Range (HDR) images can be constructed by merging (i.e. blending) multiple images with different exposure levels, e.g. with different exposure times and/or sensor sensitivity settings. For example, two or more images may be captured of a scene sequentially, and then the sequentially captured images may be blended to form an HDR image. For example, two images may be captured: a first image with a high exposure level (which may be referred to herein as a "long exposure") and a second image with a low exposure level (which may be referred to herein as a "short exposure"). The two images can be combined such that in dark image regions (e.g. in shadows) the long exposure is predominantly (e.g. solely) used to form the blended HDR image since the long exposure is likely to have less noise than the short exposure. However, in bright image regions (e.g. the sky) the long exposure may be saturated and as such the short exposure may be predominantly (e.g. solely) used to form the blended HDR image, to avoid unwanted saturation effects from the long exposure in these image regions. If transitions between the images used to form the HDR image are sharp then they may be noticeable in the HDR image, which may be perceptually detrimental. Therefore, the transitions may be smoothed over a range of pixels such that the transitions are not so sharp, and hence not so noticeable in the HDR image.

There may be a significant delay between sequentially captured images, even for the fastest sensors. A delay between images may be considered to be "significant" if it is long enough for changes to occur in the image due to the time difference between the time instances at which the images are captured, for example due to motion within the scene or motion of the camera, e.g. if the camera is implemented in a handheld device. For a number of reasons, it can prove challenging to blend two images if there is motion between the images. For example, if an object moves between two images which are then blended, artefacts such as ghosting effects may occur in the HDR image due to the difference in the position of the object in the two images. Motion in the scene due to dynamic objects or parallax could conceivably be tracked, but this would require a complex procedure which would typically require too much time and processing power to be implemented in real-time on a mobile device, such as a smart phone, tablet, smart watch or other suitable mobile device on which HDR processing may be performed and in which the processing power may be limited. It would be useful to have a method of handling motion when combining images to form an HDR image, which is simple enough to implement in real-time on mobile devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided an image processing method comprising: determining image gradient indications for at least one image; determining filter costs for image regions based on the determined image gradient indications for the at least one image; and processing data relating to the at least one image including applying a filtering operation using the determined filter costs for the image regions, so that the processing is performed for image regions in dependence upon image gradients of the at least one image.

The method may further comprise: determining a type mask which includes type indicators for image regions to thereby categorise each of the image regions into one of a plurality of types; wherein said processing data relating to the at least one image may comprise, for each of a plurality of the image regions: using the filtering operation to determine the lowest cumulative cost along a path from the image region to an image region of a particular type according to the type indicators; and selectively setting the type indicator for the image region to indicate the particular type in dependence on a comparison of the determined lowest cumulative cost with a threshold.

The at least one image may comprise a plurality of images, wherein at least one initial blending mask may indicate initial blending factors for use in combining the two images, and wherein said processing data relating to the at least one image may comprise smoothing transitions in the at least one initial blending mask at smoothing rates in accordance with the filter costs for the image regions at the respective transitions.

The processing of data relating to the at least one image may comprise using the filtering operation to apply de-noising to the at least one image such that the extent of the de-noising applied to an image region is dependent upon the filter cost for the image region.

The image regions may be at a coarser resolution than the pixels of the at least one image and the filtering operation may be applied at said coarser resolution. Using the image blending mask to blend the plurality of images may comprise upsampling the image blending mask and using the upsampled image blending mask to blend the plurality of images to form the blended image.

The at least one image may comprise a plurality of images captured with different focussing.

Processing data relating to the at least one image may comprise using the filtering operation to apply de-noising to the at least one image such that the extent of the de-noising applied to an image region is dependent upon the filter cost for the image region.

There is provided an image processing system comprising: gradient determining logic configured to determine image gradient indications for at least one image; filter cost determining logic configured to determine filter costs for image regions based on the determined image gradient indications for the at least one image; and processing logic configured to process data relating to the at least one image, the processing logic comprising filtering logic configured to apply a filtering operation using the determined filter costs for the image regions, so that the processing logic is configured to perform processing for image regions in dependence upon image gradients of the at least one image.

Computer readable code embodied in a non-transitory storage medium may be provided which is adapted to perform the steps of any of the methods described herein when the code is run on a computer. Furthermore, computer readable code may be provided for generating an image processing system according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
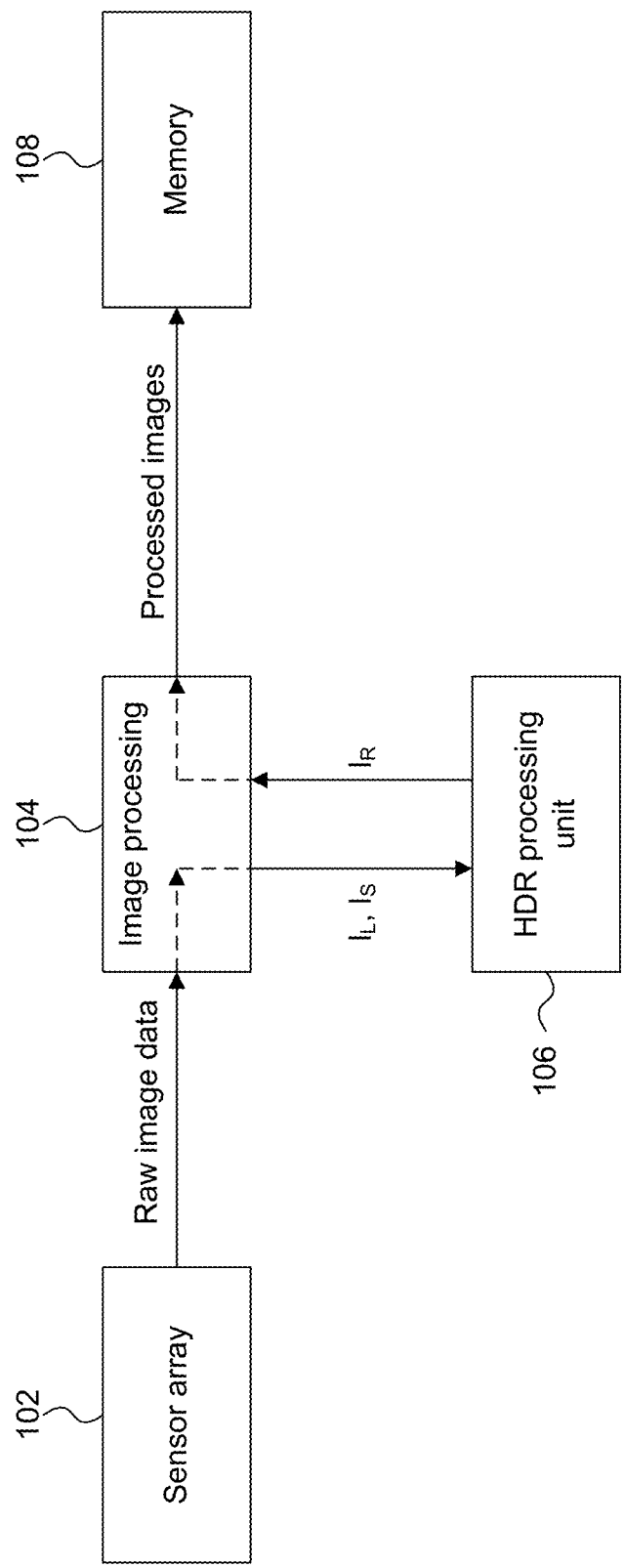
FIG. 1 is a high-level diagram of a system for processing images.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The problem of handling motion when combining images to form an HDR image is mentioned above. As mentioned above, if transitions between the images used to form the HDR image are sharp then they may be noticeable in the HDR image, which may be perceptually detrimental. To address this, the transitions may be smoothed over a range of pixels such that the transitions are not so sharp. The inventor has appreciated that in order to avoid creating visible (i.e. noticeable) seams in a combined image, transitions between source images are preferably approximately as smooth as the local image texture. That is, the rate at which a transition occurs is preferably related to the image gradients of the image regions over which the transition occurs.

For example, in smooth image regions (i.e. image regions which have small image gradients) such as image regions showing the sky or a painted surface such as a wall, transitions between the images which are used to form the blended image preferably occur gradually, over a relatively large distance; whereas in detailed image regions (i.e. image regions which have large image gradients) such as image regions showing text or a group of people or a collection of small items, transitions between the images which are used to form the blended image may occur relatively quickly, over a relatively short distance, without creating such noticeable seams in the blended image. If a transition would need to occur at a rate which would be noticeable between two image regions of different types then the image regions may be connected such that a transition is not implemented between those two image regions.

Therefore, in examples described herein, image gradients are determined for images which are to be combined. Filtering operations can be performed which use filter costs based on the image gradients in order to filter image data relating to image regions of the images in dependence upon the image gradients for the image regions. For example, as described in more detail below, the filtering operations may be used as part of a connectivity unit which determines connected image regions, and/or the filtering operations may be used as part of a blending unit which blends two or more images together to form a blended image. In other examples, the filtering operations may be used for other types of filtering which may appropriately depend upon the image gradients in an image. For example, a filtering operation could be used to apply de-noising to an image such that the extent of the de-noising applied to an image region is dependent upon the image gradients in the image region.

Embodiments will now be described by way of example in the context of Frame Sequential High Dynamic Range Image Composition which is the process of compositing a series of images taken in short succession, with varying exposure time or sensor sensitivity (e.g. from a hand-held device) in order to reconstruct an image of a scene with higher dynamic range than the camera can capture in one exposure. Corresponding methods can be applied in other examples, e.g. for combining a plurality of images captured with different focusing, wherein some image regions may be in better focus in one image, whilst other image regions may be in better focus in another image, and the images are blended image with the aim of incorporating the image regions in best focus from the plurality of images but without introducing noticeable transitions between the images.

FIG. 1 is a high-level diagram of a system for processing images in which HDR processing is applied to images. The system comprises a sensor array 102, an image processing block 104, a HDR processing unit 106 and a memory 108. The system may for example be implemented within a device such as a camera, smartphone, tablet, laptop, smartwatch or any other suitable device. The sensor array 102 comprises a plurality of light sensors for capturing raw image data. The raw image data may for example indicate light intensities at particular pixels to thereby represent an image. The raw image data is passed to the image processing block 104 which performs image processing on the raw image data to thereby determine pixel values of an image. The image processing operations performed by the image processing block 104 may be standard operations such as white balancing, de-noising, defective pixel fixing, gamut mapping, colour enhancement, etc. The image processing block 104 may be implemented in hardware or in software, or a combination thereof. For example, the image processing block 104 may be implemented in hardware as a camera pipeline which receives the raw image data from the sensor array 102 in a raster scan order (e.g. image data for pixels in a row-by-row order). At some point in the processing pipeline of the image processing block 104 the image data for images can be passed to the HDR processing unit 106. The HDR processing unit 106 performs HDR processing and provides a HDR image back to the image processing block 104 which may perform further processing on the HDR image. The processed images can then be output from the image processing block 104 and may be stored in the memory 108. The processed images may be used for other purposes, e.g. the processed images may be passed to a display for display thereon, or may be transmitted to another device, etc. In other examples, the HDR processing unit 106 may be implemented as part of the image processing block 104. Furthermore, in other examples, the HDR processing may be the final processing performed on the image data such that the HDR image provided from the HDR processing unit 106 might not pass back to the image processing block 104 and may instead be used as the output, such that it is, for example, provided to the memory 108 or to a display for display thereon or to a transmission module for transmission to another device.

Figure 2:
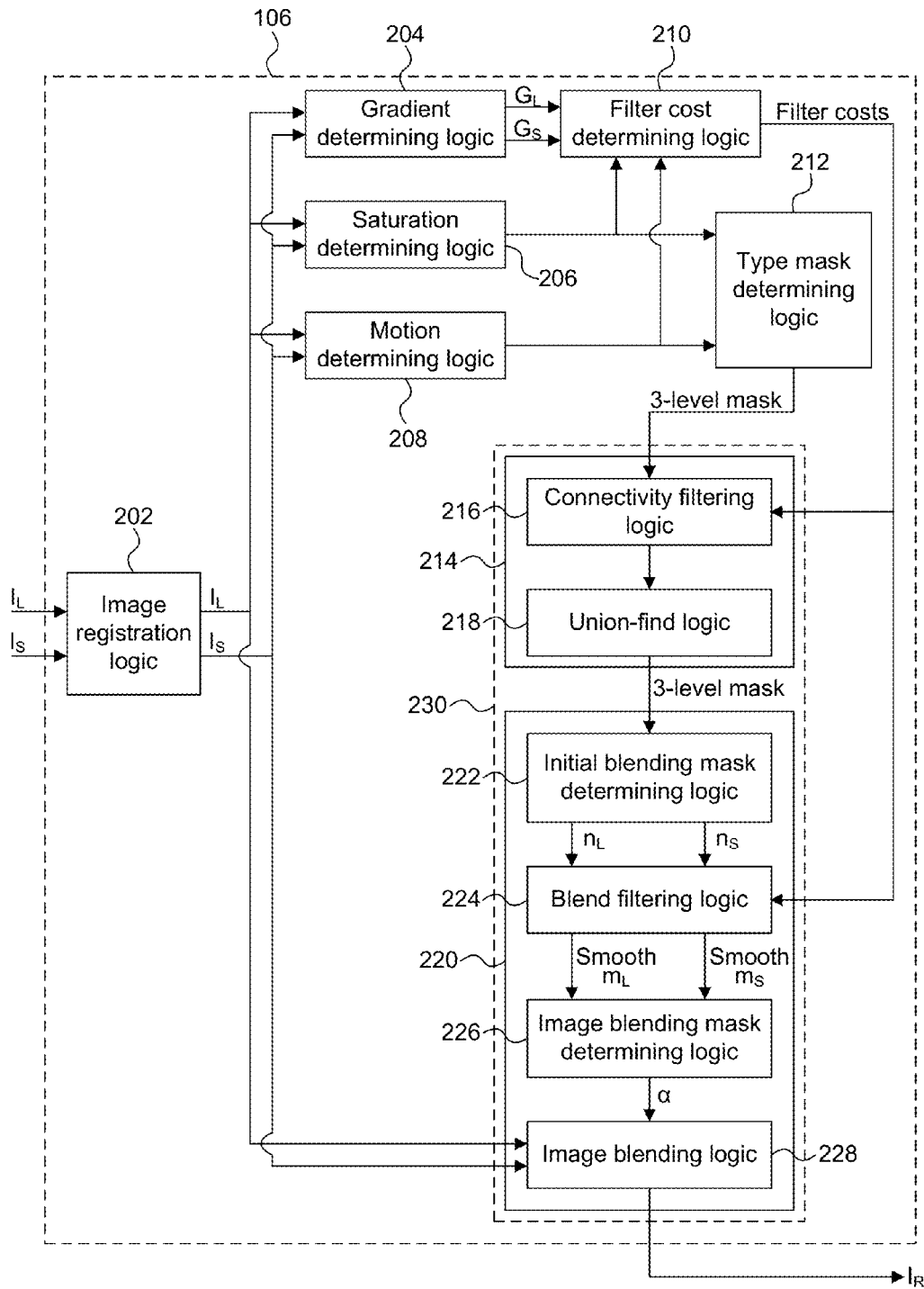
FIG. 2 is a functional block diagram of a HDR processing unit.

FIG. 2 provides a more detailed view of the HDR processing unit 106. The HDR processing unit 106 comprises image registration logic 202, gradient determining logic 204, saturation determining logic 206, motion determining logic 208, filter cost determining logic 210, type mask determining logic 212 and a connectivity unit 214 which comprises connectivity filtering logic 216 and union-find logic 218. The HDR processing unit 106 also comprises a blending unit 220 which comprises initial blend mask determining logic 222, blend filtering logic 224, image blending mask determining logic 226 and image blending logic 228. The connectivity unit 214 and the blending unit 220 may collectively be referred to herein as processing logic 230. The components of the HDR processing unit 106 (e.g. the logic blocks and units shown in FIG. 2) are intended to correspond to a number of functional blocks. This is for illustrative purposes only. FIG. 2 is not intended to define a strict division between different parts of hardware on a chip or between different programs, procedures or functions in software. In some embodiments, some or all of the algorithms described herein may be performed wholly or partly in hardware. In some implementations, at least part of the HDR processing unit 106 may be implemented by a processor (e.g. a graphics processing unit (GPU) or a central processing unit (CPU)) acting under software control. Any such software is preferably stored on a non-transient computer readable medium, such as a memory (RAM, cache, hard disk etc.) or other storage means (USB stick, CD, disk etc.).

Figure 3:
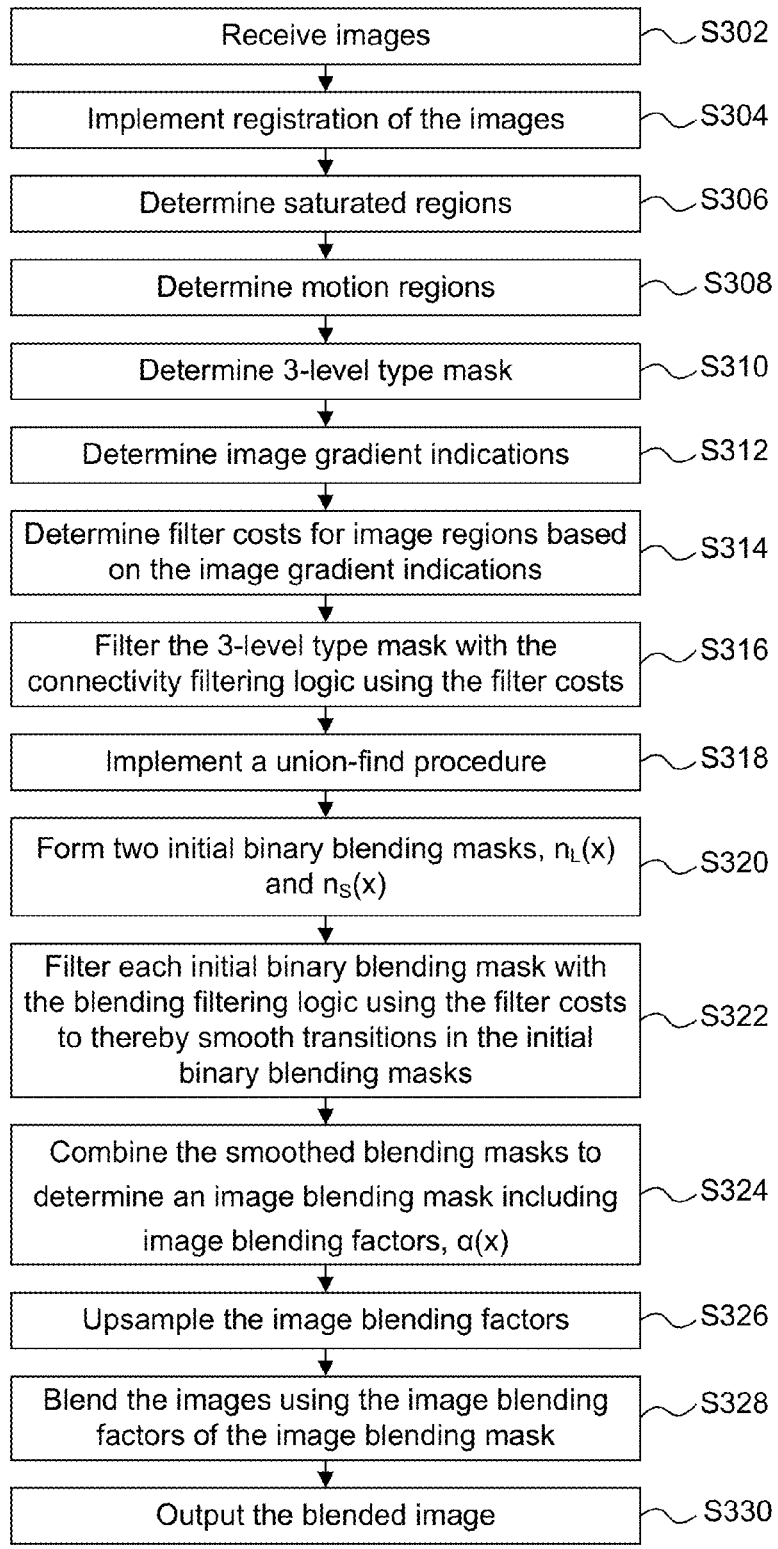
FIG. 3 is a flow chart for a method of performing HDR processing on images.

The operation of the HDR processing unit 106 is described with reference to the flow charts shown in FIGS. 3 and 4. The HDR methods described herein handle situations where motion occurs between two images in a much simpler way than trying to track the motion, such that the methods described herein are suitable for use on computer systems, such as mobile devices, in which the processing resources are significantly limited. Motion is handled by identifying image regions where motion occurs (e.g. based on differences between the images) and treating these image regions as "inconsistent" regions in which blending should not occur, so in these inconsistent regions the HDR image is formed from just one of the images. This avoids artefacts caused by the motion such as ghosting effects.

In step S302 the HDR processing unit 106 receives a plurality of images, e.g. from the image processing block 104. The images may for example be received at the image registration logic 202 as shown in FIG. 2. The images have different exposure levels so that the HDR processing unit 106 can combine images with different exposure levels to thereby form a HDR image. For example, FIG. 2 shows two images ($I_L$ and $I_S$) being received at the HDR processing unit 106, wherein image $I_L$ has a high exposure level and image $I_S$ has a low exposure level. An image with a high exposure level may be referred to herein as a "long exposure" image, although the high exposure level may be due to one or more of a number of different factors such as a long exposure time, a large aperture size and/or high sensitivity settings of the sensors in the sensor array 102. Similarly, an image with a low exposure level may be referred to herein as a "short exposure" image, although the low exposure level may be due to one or more of a number of different factors such as a short exposure time, a small aperture size and/or low sensitivity settings of the sensors in the sensor array 102. It is noted that the order in which the images are captured is not important, i.e. the long exposure image may be captured before or after the short exposure image. In other examples the HDR processing unit 106 may receive more than two images, e.g. a group of many different images may be received with different images of the group having different exposure levels.

In step S304 the image registration logic 202 performs image registration to align the images with respect to each other. In this way, the image registration logic 202 geometrically and radiometrically aligns the images with respect to each other to facilitate the subsequent HDR processing. A first of the images is treated as a reference image and then the other image is radiometrically and geometrically aligned to the reference image. In some examples the long exposure image ($I_L$) is treated as the reference image, whereas in other examples the short exposure image ($I_S$) is treated as the reference image. Methods for geometrically and radiometrically aligning images are known in the art and as such are not described in great detail herein.

The images $I_L$ and $I_S$ are radiometrically aligned, such that the intensities from the two images are on the same linear scale. For example, it may be assumed that the image data can be obtained in linear form from the image processing block 104 and that exposure time and sensitivity settings are known for the images. The images can then be radiometrically aligned by multiplying their intensity values with a relative exposure factor. For example, given an exposure time, t, and sensitivity or ISO setting, i, for a first image, $I_1$ (which is treated as the reference image), and a second image, $I_2$, the second image can be radiometrically aligned with the reference image according to the equation:

$$I_1 = \frac{t_1 i_1}{t_2 i_2} I_2 = k I_2. \tag{1}$$

The geometric alignment attempts to handle motion which may occur (either motion of objects in the scene or motion of the camera) between the time instances at which different images are captured, but imperfections may nevertheless occur in the alignment process such that the images are not perfectly aligned. As an example, the geometric registration may be based on an assumption that the camera is held approximately stationary between the time instances at which the images are captured. Camera motion may be due to the inability of the user to hold the camera perfectly still and consists predominantly of rotations on the order of up to 5% of the field of view. A projective homography model may be used to describe a transformation which could align the images. As an example, the projective homography may be estimated using a local Lucas-Kanade-based (LK) image registration method in a coarse-to-fine pyramid configuration. While it may be possible to estimate and compensate for local scene motion, dense motion compensation is computationally expensive and errors in the motion compensation would still have to be concealed. Hence such motion compensation is not implemented in the methods described herein which are suited for use on devices which have limited processing resources, such as mobile devices. As an example, to reduce computation cost, the geometric registration process may be applied to the green channels of the images only, at half the resolution of the full images. The alignment may be applied at different scales, e.g. starting at a coarse scale and then progressing to finer scales, whereby the results of the alignment at a coarse scale are used to initialise the alignment process at a finer scale.

As mentioned above, imperfections may occur in the geometric alignment process such that there may be inconsistencies in the aligned images. These inconsistencies can be concealed as described below such that in image regions at which inconsistencies occur, a blending process samples image values from only one of the images when forming a blended image.

When combining (i.e. blending) the short exposure image ($I_S$) and the long exposure image ($I_L$) to form the HDR image ($I_R$), the blending process preferably combines the best available information from the two images $I_S$ and $I_L$. Usually, the long exposure image has a better Signal to Noise Ratio (SNR), but is more likely to be saturated, than the short exposure image. When forming the HDR image, there are a number of rules which are followed in the examples described herein:

(i) For image regions which are saturated, the short exposure image is used (and the long exposure image is not used) to form the corresponding image region of the HDR image, to thereby reduce unwanted saturation effects.

(ii) To avoid ghosting effects, any connected regions containing motion are sampled from only one of the images (either $I_S$ or $I_L$). In this way, all pixels related to the same moving object are sampled from the same image to avoid discontinuous motion artefacts. This is achieved by connecting adjacent motion regions to each other and to saturation regions. Motion regions that are connected to saturated regions are sampled from the short exposure image (and not the long exposure image), whilst motion regions that are not connected to saturated regions are preferably sampled from the long exposure image (and not the short exposure image). A more detailed description of what is meant by the term "connected" in this context is provided below.

(iii) If it is compatible with the two requirements above, image regions of the HDR image are preferably formed using the long exposure image and not the short exposure image because the long exposure image typically has a higher SNR than the short exposure image.

(iv) Transitions between the image which is used to form the image regions in the HDR image are smoothed over a range of image regions. In this way the transitions are gradual. This is because abrupt transitions between source images may result in noticeable seams in the HDR image and would reveal small registration imperfections and differences in image characteristics. As such, the images are blended smoothly to hide the transitions.

The aligned images are passed from the image registration logic 202 to the gradient determining logic 204, the saturation determining logic 206, the motion determining logic 208 and the image blending logic 228.

In step S306, the saturation determining logic 206 determines image regions which are saturated in one or both of the images. The long exposure image has a higher exposure level than the short exposure image, so it is sufficient to consider the long exposure image (and not the short exposure image) in order to determine image regions which are saturated. That is because an assumption can be made that any saturated regions in the short exposure image will also be saturated regions in the long exposure image. Therefore, as an example, saturated image regions are detected by determining whether, for each colour channel of the long exposure image ($I_L$) the intensity values are greater than a saturation threshold. An image region with any channel above the saturation threshold is marked as saturated. In this way a saturation mask is formed which indicates for each image region, whether the image region is saturated or not. An image region describes an image position at which both of the images ($I_S$ and $I_L$) may have image values. The image regions may be at the same resolution as the images ($I_S$ and $I_L$) such that each image region corresponds to a respective pixel position. Alternatively, the image regions may be at a coarser resolution than the pixels of the images ($I_S$ and $I_L$) such that each image region corresponds to a respective group of pixel positions. In this way, filtering operations may be applied to the image regions at a coarser resolution than that of the pixels of the images ($I_S$ and $I_L$).

In step S308 the motion determining logic 208 determines image regions in which motion is present between the two images $I_S$ and $I_L$. Motion is detected at an image region by computing an error metric between the image values of the two images at the position of the image region. The "error metric" is a measure of the difference between the images. It is noted that although the two images initially have different exposure levels, the radiometric alignment performed in step S304 removes this difference so that the motion detection can be performed between the two images without further radiometric registration.

The noise mean is removed from the images. A low-pass filter will be used later on to prevent detecting noise as motion. For this to be effective, the noise mean is preferably zero so that the local average (filtered) noise is zero. Image noise typically does not have a mean of zero, or the black point in the meta-data may be incorrect. The sensor noise mean can be measured by capturing images while not exposing the sensor to light. In some examples, the sensor array 102 may provide an unexposed sensor area for measuring black level and noise for every captured frame. The mean of the resulting black image, $I_B$, is approximately related to the image black level, b, and the noise mean, $n_\mu$, times the sensor sensitivity (ISO setting), i as, mean($I_B$)= $n_\mu$i+b. By capturing black images with varying ISO setting, $n_\mu$ and b can be recovered using a simple linear fit.

In preferred examples, the colour channels are weighted according to their visual importance and to compensate for the different sensitivities of the image sensors of the sensor array 102 for each channel. A weight matrix, W, may for example be computed from the ITU-R BT.2020 weights for computing luma from RGB, and the inverse of the channel gains, $\{g_R, g_G, g_B\}$ (where colour correction and white balance have been applied, the gains will be 1), such that:

$$W = \text{diag}(0.2627 g_R^{-1}, 0.6780 g_G^{-1}, 0.0593 g_B^{-1}) \quad (2)$$

The luma normalised difference image, D(x), is found using the following equations:

$$I'_L(x) = W(I_L(x) - n_\mu), \quad (3)$$

$$I'_S(x) = kW(I_S(x) - n_\mu), \quad (4)$$

$$D(x) = \frac{I'_R(x) - I'_A(x)}{1 + \sum_{RGB} I'_R(x) + \sum_{RGB} I'_A(x) +}, \quad (5)$$

where $I'_R(x)$ is the noise adjusted reference image and $I'_A(x)$ is the noise adjusted non-reference image. For example, if the long exposure image $I_L$ is the reference image then $I'_R(x)=I'_L(x)$ and $I'_A(x)=I'_S(x)$, and vice versa if the short exposure image is the reference image.

A low-pass filter is applied to the difference image, D(x), to reduce the effects of image noise. A recursive resampling filter is used to determine a filtered version of the difference image, $D_f=f(D,n)$. For example, the image may be downsampled by summing nxn blocks of pixels ($n=2^m$, m∈N), and then recursively up-sampled by a factor of 2, up to the original resolution, using bilinear interpolation. The amount of filtering required depends on the noise characteristics of the image. An error image, $e_{sse}(x)$, is computed from the filtered difference image, $D_f$, by summing over the squares of the RGB channels, e.g. according to the equation:

$$e_{sse}(x) = \Sigma_{RGB} D_f^2(x) \quad (6)$$

Motion regions are identified by applying a threshold to the sum-of-squared error image ($e_{sse}(x)$). In this way a motion mask is formed which indicates for each image region, whether there is motion in the image region or not.

In step S310 the type mask determining logic 212 combines the saturation and motion masks into one 3-level mask, referred to herein as a "type mask", m(x). In examples described herein, in the type mask, saturated image regions have a value of 2, motion image regions have a value of 1, and image regions which have neither saturation nor motion have a value of 0. Therefore the type mask includes type indicators for image regions to thereby categorise each of the image regions into one a plurality of types: e.g. saturated, motion or null. Saturated image regions are often detected as motion in the motion mask because the saturation can cause a difference between the two images which is above the motion threshold described above. If an image region has both saturation and motion according to the saturation and motion masks then the type mask indicates this image region as a saturated image region (giving it a value of 2 in the type mask). That is, saturation takes precedence over motion in the type mask. Therefore, the type mask indicates the maximum of the two values where motion and saturation overlap.

Figure 5:
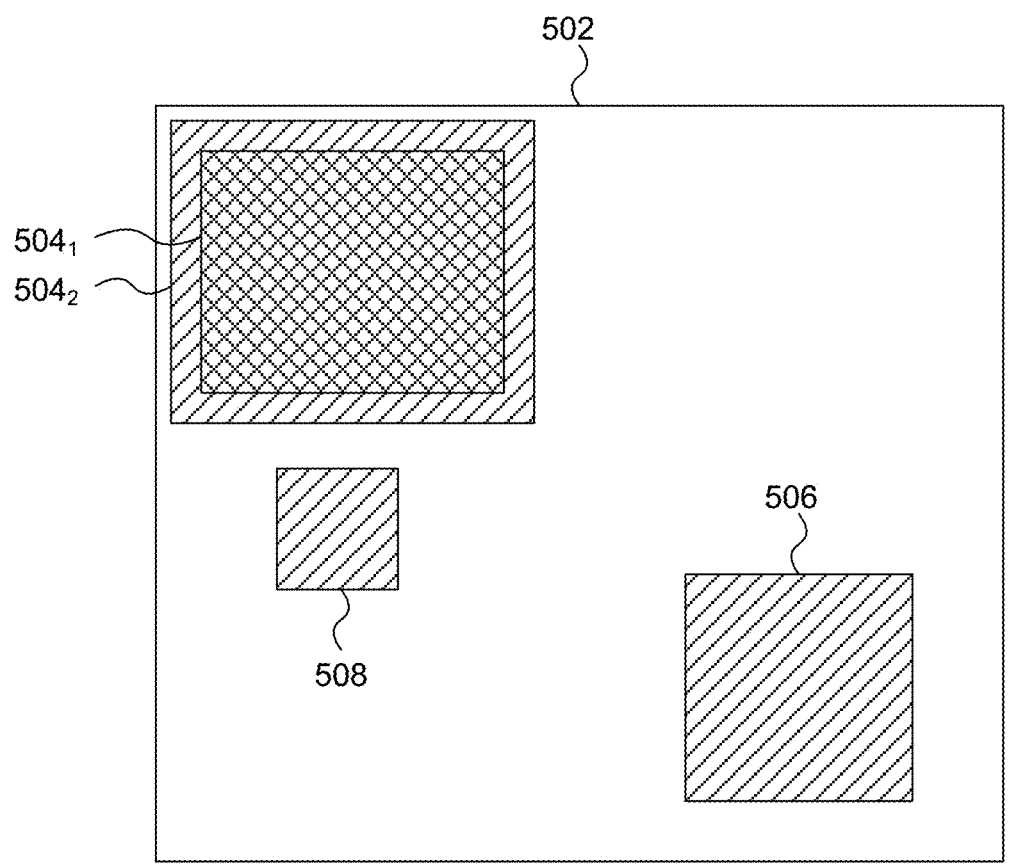
FIG. 5 represents a type mask for image regions.

FIG. 5 shows an example type mask 502 which includes a saturated region $504_1$ (shown with cross-hatching). The saturated region $504_1$ is surrounded by a motion region $504_2$ (shown with diagonal hatching). Saturated regions are often surrounded by regions which are initially determined to be motion regions because the saturation causes differences between the two images. The white regions in FIG. 5 represent image regions which are neither saturated regions nor regions including motion. The type mask 502 also includes two more motion regions 506 and 508. Motion region 508 is close to saturated region $504_1$ and therefore may be connected to it when the connectivity filtering unit 214 is implemented as described below, whereas the motion region 506 is not close to saturated region $504_1$ and therefore might not be connected to it when the connectivity filtering unit 214 is implemented.

In step S312 the gradient determining logic 204 determines image gradient indications, g, for each of the images $I_L$ and $I_S$. The image gradient indication for an image region of an image provides an indication of the level of detail in the image region of the image. The image regions for which image gradient indications are determined may be the positions of pixels or blocks of pixels of an image. For example, the image gradient indication, g, for an image region may be determined by finding a normalised gradient magnitude of each image's green channel computed at half resolution from each 2×2 pixel block, $$p_{2\times 2} = \begin{bmatrix} p_{00} & p_{01} \\ p_{10} & p_{11} \end{bmatrix}$$

according to the equation:

$$g = \frac{|p_{01} + p_{11} - p_{00} - p_{10}| + |p_{10} + p_{11} - p_{00} - p_{01}|}{p_{00} + p_{01} + p_{10} + p_{11} + 1}. \quad (7)$$

All of the image gradient indications for the image regions, x, of the long exposure image, $I_L$, are combined into a matrix $G_L$. Similarly, all of the image gradient indications for the image regions, x, of the short exposure image, $I_S$, are combined into a matrix $G_S$. These matrices are passed to the filter cost determining logic 210.

In step S314, the filter cost determining logic 210 determines filter costs for image regions based on the determined image gradient indications for the short and long exposure images $I_S$ and $I_L$. The "filter costs" of the image regions are weightings for use in applying filtering to the image regions. That is, the filter cost for an image region is a measure of the effect that the image region has in terms of an attribute that is filtered. For example, the attribute may be "closeness" in terms of whether two image regions are connectable. In this case, the filter costs of image regions can be used by a connectivity filter to define the closeness of two image regions based on a sum of the filter costs along a path between the two image regions. Since the filter cost of an image region depends on image gradients at the image region, the closeness of two image regions depends upon the image gradients along the path. In another example, the attribute may be "smoothness", such that the filter costs, defining the smoothness of image regions, can be used by a blending filter to determine the rate at which blending masks vary across the image regions.

As described in more detail below the filter costs are used in filtering operations to thereby filter image data relating to the images $I_S$ and $I_L$ in dependence upon image gradients of the images $I_S$ and $I_L$. A filter cost, B(x), may be determined for an image region by determining a minimum gradient indication for the image region from the images $I_S$ and $I_L$, then multiplying the determined minimum gradient indication by a multiplication factor ($b_{gain}$), and then adding an offset ($b_{min}$) to the result of the multiplication. In this way, a matrix, B, of filter costs B(x) is determined, according to the equation:

$$B = b_{min} + b_{gain} \min(G_L, G_S). \qquad (8)$$

$b_{min}$ is a parameter which sets a minimum cost, such that B(x) is not zero even in perfectly homogenous regions, to thereby ensure soft but steady blending even in perfectly homogenous regions. For example, $b_{min}$ may be set to be of the order of 0.001 which experiments have shown to be a suitable value. Furthermore, $b_{gain}$ is a parameter which sets an overall gain factor to control the rate at which blending occurs over image regions relative to the level of detail in the image regions. In some examples, $b_{gain}$ is set to approximately 0.25 and this performs well in experiments. In examples described herein, the filter costs are in a range from 0 to 1, i.e. $0 \le B(x) \le 1$. The filter costs for image regions that fall outside of one of the source images (where images do not completely overlap) are set to 1. As will become apparent from the description below, this prevents blending or connectivity propagating around the outside of images. The filter costs may be downsampled such that the filter costs are at a lower resolution than the image regions. This may reduce the amount of processing that is performed when the filter costs are used to perform filtering operations such using the connectivity filtering logic 216 and/or the blend filtering logic 224. Furthermore, the filter cost determining logic 210 receives the indications of the saturated image regions and the motion regions, and sets the filter costs for these regions to 1, to prevent blending from passing through nearby saturated or motion regions.

In order for motion concealment to yield convincing results, entire objects must be treated in a consistent manner. Rather than performing high level object segmentation, which is a very complex computer vision problem, saturated and motion pixels are grouped into connected sets. Since the objective is to assign entire moving objects to either the short exposure image (where part of the object is saturated) or to the long exposure image (where no part of the object is saturated), the problem can be simplified to one of filling the saturated state into connected motion regions.

The motion mask often contains many small holes and lines that can divide objects, due to the noise filtering step and coincidental image similarities. To bridge these gaps in the type mask, for the purposes of determining connectivity in the connectivity unit 214, the connectivity unit 214 may down-sample the type mask by a multiple of 2 to reduce the resolution of the type mask, e.g. to approximately 512 pixels. Each image region in the reduced resolution type mask, $m_c(x)$, corresponds to a c×c block of image regions in the original type mask m(x), $$m_c(x) \leftrightarrow m([cx, cx + [c, c]^\top]) = \begin{bmatrix} m_{1,1} & \cdots & m_{c,1} \\ \vdots & \ddots & \vdots \\ m_{1,c} & \cdots & m_{c,c} \end{bmatrix} = m_{sx}, \qquad (9)$$

The value of the reduced resolution mask is found such that:

$$m_c(x) = \begin{cases} 2, & \text{any}(m_{sx} = 2) \\ 1, & \text{any}(m_{sx} = 1) \cdot \overline{\text{any}}(m_{sx} = 2) \\ 0, & \text{otherwise} \end{cases} \qquad (10)$$

In this way, if a c×c block of image regions in the original type mask m(x) contains at least one saturated image region, then the corresponding image region in the reduced resolution type mask $m_c(x)$ is marked as saturated (i.e. given a value of 2); otherwise, if the block contains at least one motion image region, then the corresponding image region in the reduced resolution type mask $m_c(x)$ is marked as motion (i.e. given a value of 1); otherwise, the corresponding image region in the reduced resolution type mask $m_c(x)$ is marked to the null state (i.e. given a value of 0).

The filter costs B(x) are down-sampled to the same resolution as the reduced resolution type mask $m_c(x)$ by summing over the corresponding area, such that the reduced resolution filter costs $B_c(x)$ are given by $B_c(x) \leftarrow \Sigma_{i=cx}^{cx+c} \Sigma_{j=cy}^{cy+c} B(i,j)$. In the following description of the operation of the connectivity unit 214, references to the filter costs B(x) may be understood to be referring to the reduced resolution filter costs $B_c(x)$ in the preferred examples in which the resolution of the filter costs is reduced.

The low resolution 3-level type mask is passed from the type mask determining logic 212 to the connectivity unit 214. Furthermore, the filter costs are passed from the filter cost determining logic 210 to the connectivity unit 214. The connectivity unit 214 applies two processes (in steps S316 and S318) to the low resolution type mask to fill the saturation state over connected motion regions. The first is a filtering operation applied by the connectivity filtering logic 216 that can connect image regions across smooth image areas, and the second is a union-find fill algorithm implemented by the union-find logic 218 that connects adjacent pixels based on their type indicators. In the following description of the operation of the connectivity unit 214, references to the type mask m(x) may be understood to be referring to the reduced resolution type mask $m_c(x)$ in the preferred examples in which the resolution of the type mask is reduced, as described above.

In step S316 the connectivity filtering logic 216 applies a filtering operation to the type mask using the determined filter costs for the image regions. By using the filter costs determined as described above, the connectivity filtering logic 216 filters the type mask in dependence upon image gradients of the images $I_L$ and $I_S$. The connectivity filtering logic 216 may apply a recursive filtering operation which determines a respective cumulative cost for each of a plurality of the image regions by finding the lowest cumulative cost (of the filter costs) along a path from the image region to an image region of interest. For example, the image region of interest may be a saturated image region, such that the cumulative cost for an image region is the lowest cumulative cost of the filter costs along a path from the image region to a saturated region. The type indicator for an image region may be selectively set to indicate the saturated type in dependence on a comparison of the determined lowest cumulative cost with a threshold. This may further be in dependence upon the type of the image region, e.g. the type indicators may be set in this way if they were initially set to the motion type. For example, motion image regions which are found to be close to saturated image regions are reclassified as saturated image regions in the type mask. An image region is "close" to a saturated image region if the cumulative cost determined for the image region is less than a threshold. The purpose of the filtering operation performed by the connectivity filtering logic 216 is to connect image regions that are discontinuous in smooth image areas, such as the sky, over distances for which a transition between using different images to form the HDR image would be noticeable.

Figure 6:
FIG. 6 shows a first example of processing a type mask with a connectivity filter.

FIG. 6 shows an example of the type mask 602 before the connectivity filtering operation and the type mask 604 after the connectivity filtering operation for an image which has predominantly low image gradients, e.g. an image of a cloudy sky. In FIG. 6, the white image regions have the saturated type indicator, the patterned image regions have the motion type indicator and the black image regions have the null type indicator. It can be seen in 602 that motion is detected between the two images, and the motion regions are fragmented (i.e. not all connected) so a union-find procedure could not connect all the motion image regions in the images. However, because the images ($I_S$ and $I_L$) have low image gradients, the filter costs B(x) for these image regions are low such that the connectivity filtering logic 216 can bridge the gaps between the motion image regions in the cloudy sky and all of these motion regions are connected such that they are all changed to the saturated type in the filtered type mask 604 because they are connected to at least one saturated region. This is useful because transitions between the image used to form the HDR image would probably be noticeable in some of the image regions (e.g. regions showing a cloudy sky) due to the low image gradients in those image regions.

Figure 4:
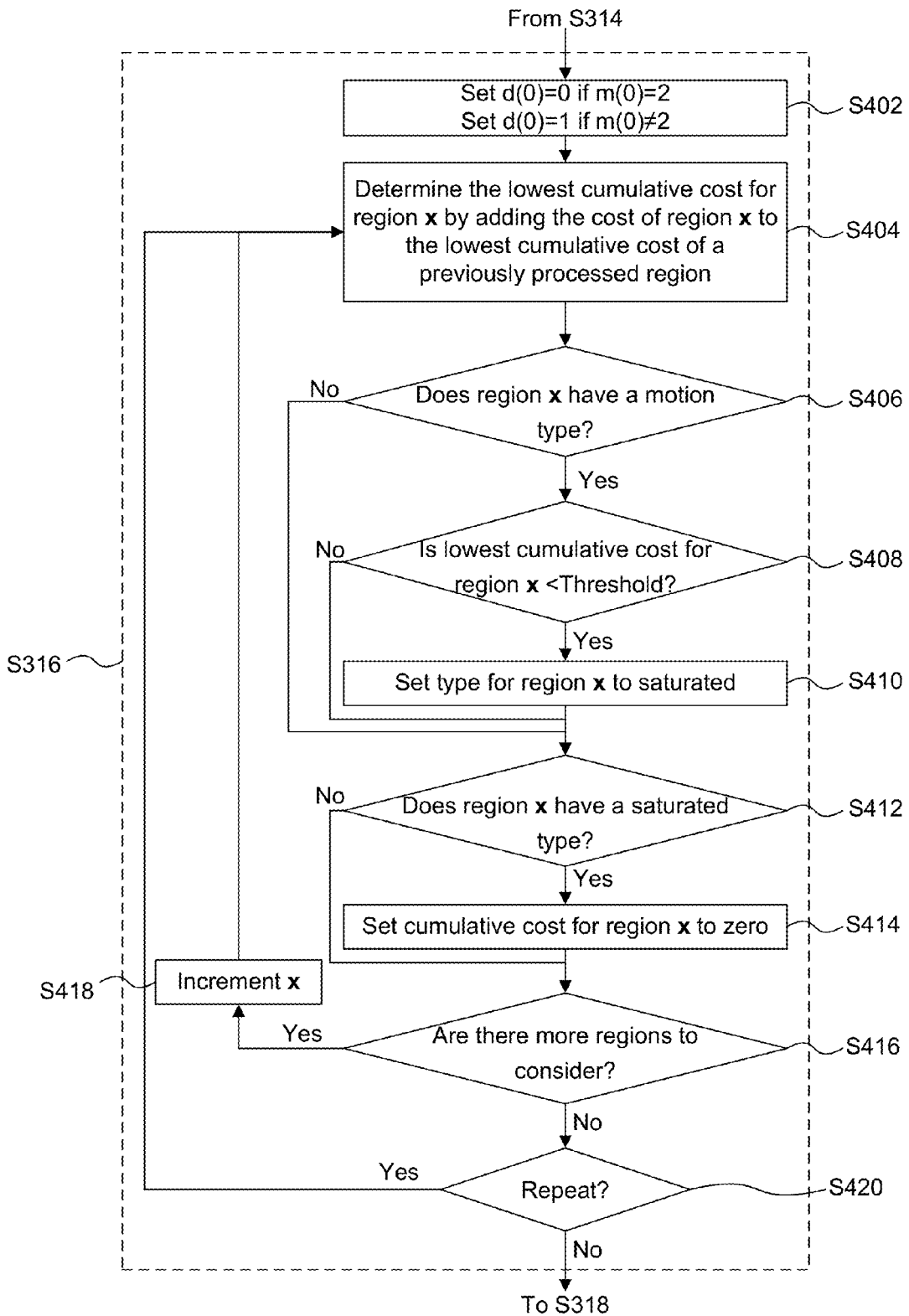
FIG. 4 is a flow chart showing a detailed view of a filtering step.

FIG. 4 shows an example of the steps that are carried out as part of step S316 in order to filter the type mask, m(x). The connectivity filtering logic 216 receives the type mask having type indicators to indicate the type of the image regions, according to:

$$m(x) = \begin{cases} 0 & \text{Null} \\ 1 & \text{Motion} \\ 2 & \text{Saturation} \end{cases}$$

Cumulative costs for the image regions are determined using the filter costs B(x). The cumulative costs may be referred to as "distances", d(x), but it should be noted that these "distances" are weighted by the filter costs and are not necessarily indicative of the actual physical distance between an image region and a saturated region. Conceptually, a distance map of the distances, d(x), is computed recursively to map the distance to the nearest saturated image region. In step S402, the cumulative cost (or "distance") for the first image region, d(0), is set to a value of 0 if the first image region is saturated, i.e. if m(0)=2, otherwise the cumulative cost for the first image region, d(0), is set to a value of 1, i.e. if m(0)≠2. The rest of the cumulative costs are determined by the connectivity filtering logic 216 as illustrated in FIG. 4.

Steps S404 to S418 shown in FIG. 4 are implemented for each image region, in a recursive manner. That is, the filtering operation applied by the connectivity filtering logic 216 is a recursive filtering operation. As described in more detail below, in the examples described herein the recursive filtering operation is performed in a forward direction and in a reverse direction. The order in which the image regions are processed may be different in different examples and may for example progress in a diagonal manner across the image. In step S404, the lowest cumulative cost d(x) for an image region x is determined by adding the filter cost B(x) of the region x to the lowest cumulative cost of a previously processed image region. For example, the previously processed image region may be whichever of the image regions immediately above or immediately to the left of the image region x has the lower cumulative cost. This can be expressed as:

$$d(x) = \min\left(d\left(x - \begin{bmatrix} 1 \\ 0 \end{bmatrix}\right), d\left(x - \begin{bmatrix} 0 \\ 1 \end{bmatrix}\right)\right) + B_c(x). \tag{11}$$

In step S406 it is determined whether the image region x has the motion type. That is, it is determined whether the type indicator m(x)=1. If so, the method passes to step S408 in which it is determined whether the cumulative cost d(x) for the image region x is less than a threshold, T. In an example, the threshold T is set at ⅔, but in other examples the threshold may be set at other values, e.g. in the range ½≤T≤1. If it is determined in step S408 that d(x)<T then the method passes to step S410. A person skilled in the art would understand that in other examples, the test in step S408 may be whether d(x) is less than or equal to T rather than whether d(x) is less than T. In step S410 the type indicator for the image region x is set to indicate the saturated type. That is, m(x) is set to a value of 2 in the examples described in detail herein. The method proceeds from step S410 to step S412. Furthermore, if it was determined in step S406 that image region x does not have a motion type then the method passes from step S406 to step S412 without performing steps S408 or S410. Furthermore, if it was determined in step S408 that the cumulative cost for the image region x is not less than the threshold then the method passes from step S408 to step S412 without performing step S410.

Therefore, steps S406 to S410 mean that if an image region which was initially a motion region (with m(x)=1) is "close" to a saturated region then the type indicator for the image region is set to indicate the saturated type (i.e. m(x) is set to have a value of 2), thereby connecting the motion region to the nearby saturated region. The "closeness" is determined by determining whether the cumulative cost for the image region is less than the threshold, such that the closeness takes account of the image gradients in the image. In this way, a motion region may be connected to a saturated region over a large physical distance if the image gradients are low over that distance. This may be beneficial because a transition of the image used for forming an HDR image between the two regions may be noticeable due to the low image gradients in the transition region. In contrast, a motion region might not be connected to a saturated region over a small physical distance if the image gradients are high over that distance. This may be beneficial because a transition of the image used for forming an HDR image between the two regions might not be noticeable due to the high image gradients in the transition region.

In step S412 it is determined whether the image region x has a saturated type, i.e. whether m(x)=2. If so, the method passes to step S414 in which the cumulative cost d(x) for the image region x is set to zero. The method passes from step S414 to step S416. Furthermore, if it was determined in step S412 that the image region x does not have a saturated type, i.e. m(x)≠2, then the method passes from step S412 to step S416 without performing step S414.

In step S416 it is determined whether there are any more image regions to consider, and if so the method passes to step S418 in which x is incremented. As described above, the order in which the image regions are processed may be different in different examples and the way in which x is incremented determines the order in which the image regions are processed. For example, the image regions may be processed in a diagonal manner starting from a corner of the image and progressing in diagonal lines which are incrementally further away from the starting corner. The method then passes back to step S404 to repeat steps S404 to S418 for the next image region. If it is determined in step S416 that there are no more image regions to consider then the method passes to step S420 in which it is determined whether the method should repeat for the image, and if so, the method passes back to step S404. For example, the method may be performed first in a forward direction (e.g. starting in the top left image region and progressing towards the bottom right image region) and then the method may be repeated in a reverse direction (e.g. starting in the bottom right image region and progressing towards the top left image region).

Some of the steps may be slightly different when the method is performed in reverse. For example, in the reverse direction, the method first considers the final image region (d(N) where N is the number of image regions) and then works backwards towards the first image region to determine the cumulative costs. This second pass in decreasing order of x makes the process symmetric. When processing in reverse order, equation 11 used in step S404 is replaced with equation 12:

$$d(x) = \min\left(d\left(x + \begin{bmatrix} 1 \\ 0 \end{bmatrix}\right), d\left(x + \begin{bmatrix} 0 \\ 1 \end{bmatrix}\right)\right) + B(x). \quad (12)$$

Furthermore, in step S418, x is decremented rather than incremented when processing in the reverse order. If the connectivity filtering logic 216 was applied many times then a stable result may be converged upon, however two passes (e.g. once in a forward direction and once in a reverse direction) tend to be sufficient for dealing with the smooth areas of images that the connectivity filtering logic 216 is intended for.

In other examples, rather than processing the image regions in a diagonal manner, the method may be decomposed into processing x- and y-directions separately by using only one of the neighbours in equations 11 and 12 at a time. In these examples, twice as many passes over the image are implemented, but these methods may be beneficial for certain implementations. For example, a GPU may more efficiently process many rows or columns in parallel, which prohibits transferring information in two directions simultaneously (due to sequential dependence), but may be many times faster.

When the method is to repeat no more (as determined in step S420), e.g. after two passes, then step S316 is complete and the method continues to step S318.

In step S318 the union-find logic 218 implements a union-find procedure to selectively set the type indicators to indicate the saturated type for image regions which have the motion type and which are connected to an image region having the saturated type. In this way the union-find fill algorithm is used to take account of connectivity in elaborate structures. A person skilled in the art would understand how to implement the union-find procedure. For example, the union-find procedure may be used to find sets of image regions which are connected by 8-neighbour adjacency. If a connected region contains any saturated image regions, then all the image regions in the connected region are labelled as saturated.

Figure 7:
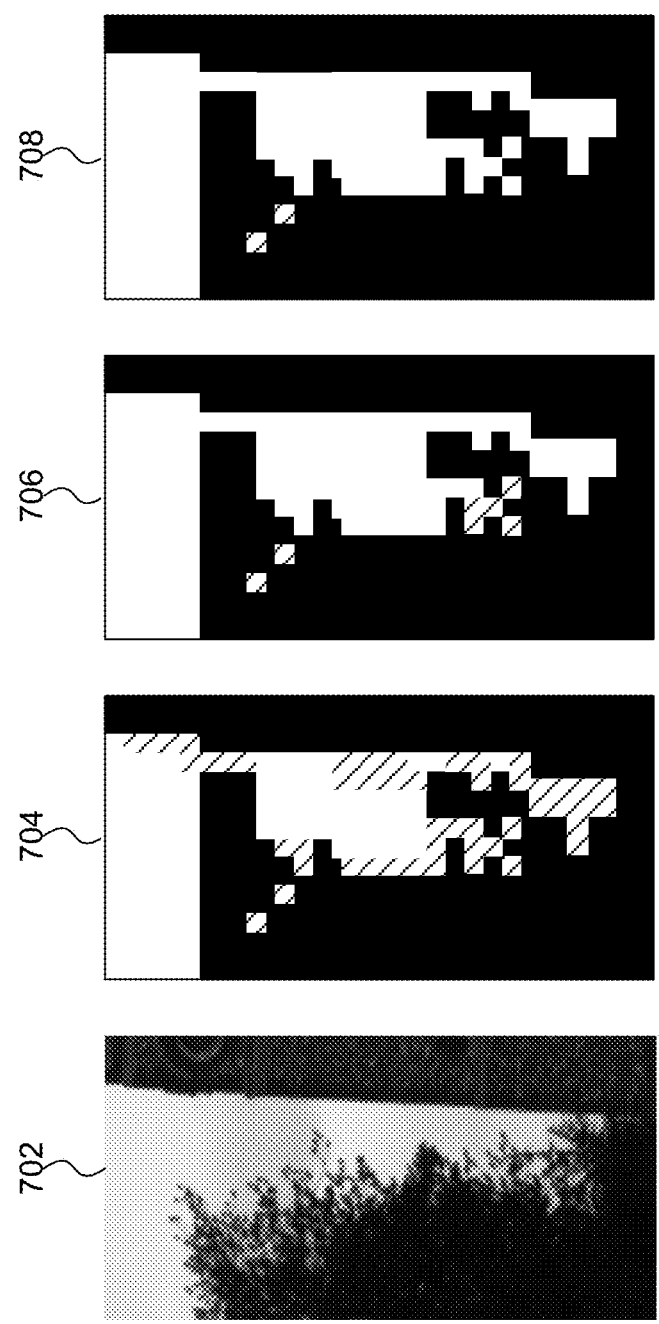
FIG. 7 shows a second example of processing a type mask with a connectivity filter.

FIG. 7 shows an example of an image 702 comprising a saturated region near an elaborate, high-contrast edge, with motion in some regions. An initial downsampled type mask 704 (e.g. as outputted by the type mask determining logic 212 in step S310) is shown which indicates saturated regions (as white regions), motion regions (as hatched regions) and null regions (as black regions). The type mask after the connectivity filtering logic 216 has been applied is shown as 706 and it can be seen that a lot of the motion regions have been converted to saturated regions, but some of the motion regions have not been connected with the saturated regions in areas of high image detail (e.g. between tree branches in the image 702). The type mask after the union-find logic 218 has been applied is shown as 708 and it can be seen that connected motion regions from mask 706 have been set to the saturated type, with just two disconnected motion regions remaining as motion regions. The union-find method is able to connect image regions in areas of high image detail (e.g. between the tree branches), where the connectivity filtering logic 216 could not connect due to high image gradients.

After step S318, the original resolution type mask, m(x), is updated using the modified reduced resolution type mask $m_c(x)$. In order to do this, wherever a mask value in the reduced resolution type mask $m_c(x)$ has changed from 1 to 2, the change is propagated back to the original type mask m(x) according to the equation:

$$m(x) \leftarrow \begin{cases} 0 & m(x) = 0 \\ \max(m(x), m_c(x)) & \text{otherwise} \end{cases} \quad (12a)$$

Figure 8:
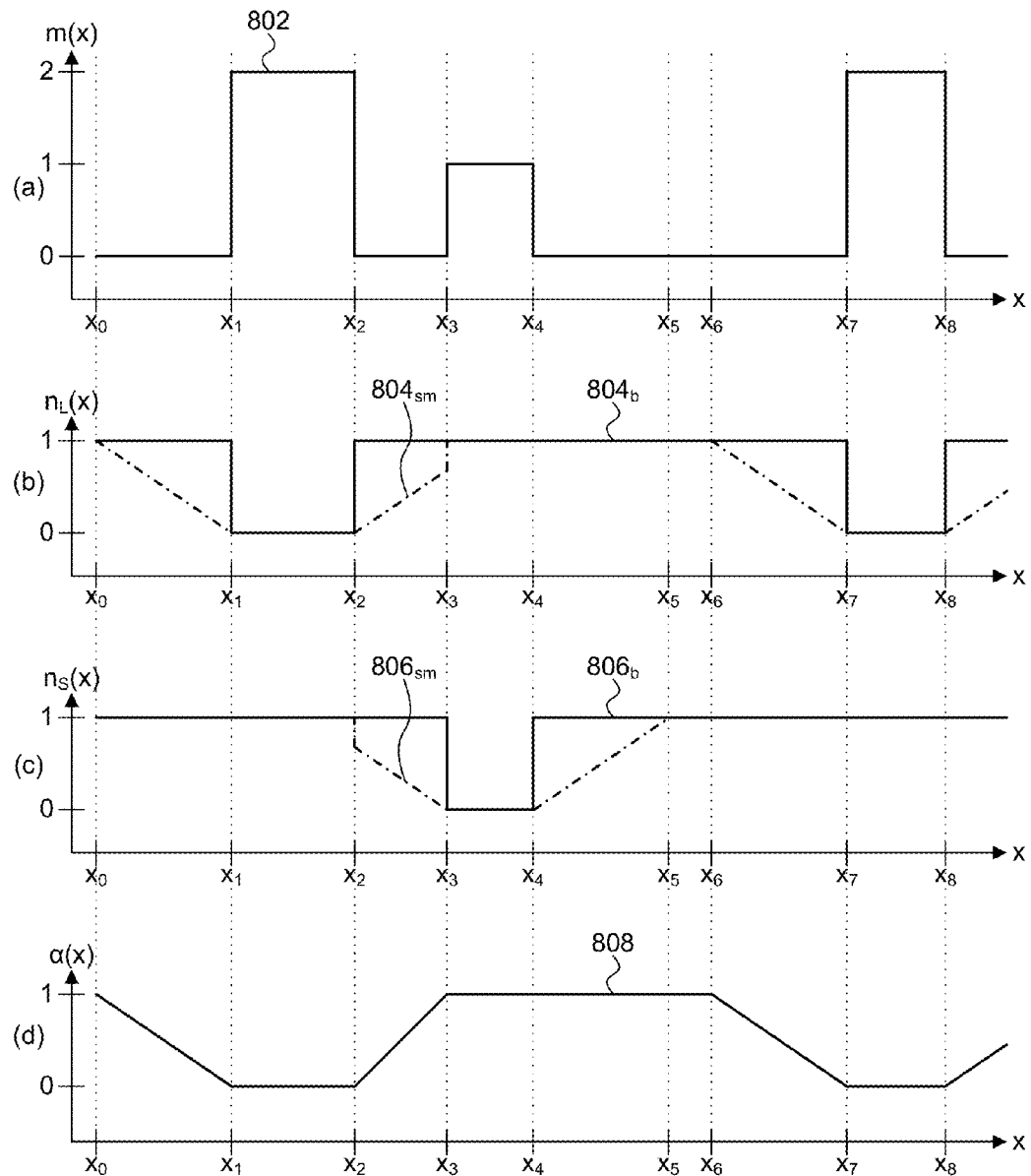
FIG. 8 illustrates a process of smoothing a blending mask.

The type mask is passed from the connectivity unit 214 to the blending unit 220. For clarity, FIG. 8a shows a graph representing the values of the type indicators 802 for just one row of image regions in the type mask m(x). In step S320 the initial blending mask determining logic 222 determines the initial blending factors of two initial blending masks, $n_L(x)$ and $n_S(x)$ based on the type indicators from the type mask m(x). The initial blending mask $n_L(x)$ is a binary mask which indicates whether or not the corresponding image regions have saturated type indicators in the type mask m(x). The initial blending mask $n_S(x)$ is a binary mask which indicates whether or not the corresponding image regions have motion type indicators in the type mask m(x).

FIG. 8b shows a graph of the initial binary blending mask $n_L(x)$ as the solid line $804_b$. The initial blending mask $n_L(x)$ has a value of 0 for image regions which have a saturated type in the type mask m(x) (i.e. $n_L(x)=0$ if m(x)=2), and a value of 1 for image regions which do not have a saturated type in the type mask m(x) (i.e. $n_L(x)=1$ if m(x)≠2). Similarly, FIG. 8c shows a graph of the initial binary blending mask $n_S(x)$ as the solid line $806_b$. The initial blending mask $n_S(x)$ has a value of 0 for image regions which have a motion type in the type mask m(x) (i.e. $n_S(x)=0$ if m(x)=1), and a value of 1 for image regions which do not have a motion type in the type mask m(x) (i.e. $n_S(x)=1$ if m(x)≠1).

Using a binary mask to merge images would introduce sharp edges in the final image. These are particularly intrusive in smooth, moving scene regions, such as faces and clouds. In particular, the blending unit 220 preferably only blends more than one image to form pixels of the HDR image in image regions which are unsaturated and have no motion. In saturated image regions only the short exposure image is used, whilst in connected motion regions only one of the input images is used, which is preferably but not necessarily the long exposure image. The two initial blending masks are used to form an image blending mask which is used to combine the long exposure image with the short exposure image to form the HDR image. The image blending mask is preferably approximately as smooth as the image. That is the image blending mask should have transitions which are as smooth as the image. For example, where the image contains a sharp edge, this edge can be exploited to hide a transition in the image blending mask. Furthermore, where saturated and unsaturated regions are near to each other, the transition from one to the other is preferably smooth and monotonic.

The mask $n_S(x)$ is for saturated regions and the mask $n_L(x)$ is for unsaturated motion regions. Each initial blending mask is filtered separately and then combined to form an image blending mask. The filter costs (i.e. the blend rate) are set to 1 in image regions where the type mask is non-zero, i.e. in saturated or motion regions. In this way the filter costs are modified to be $B'(x)$, according to:

$$B'(x) = \begin{cases} B(x) & m(x) = 0 \\ 1 & m(x) \neq 0 \end{cases} \quad (12b)$$

Setting the blend rate to 1 in image regions where the type mask is non-zero prevents the blending process in one mask extending beyond a neighbouring region in the other mask.

The filter cost $B'(x)$ of an image region x provides an indication of the smoothness of the image region. In step S322 the blend filtering logic 224 filters each of the initial binary blending masks ($n_S(x)$ and $n_L(x)$) using the filter costs $B'(x)$. In this way transitions in the initial blending masks are smoothed at smoothing rates in accordance with the filter costs for the image regions at the respective transitions. For example, the blend filtering logic 224 may be configured, in a similar way to the connectivity filtering logic 216, to implement a filtering operation as a recursive filtering operation using the filter costs, and may perform the filtering multiple times, e.g. in a forward direction and then in a reverse direction. For example, the forward filtering operation (starting at the first image region, x=0) which is performed by the blend filtering logic 224 on each of the initial blending masks, ($n_L(x)$ and $n_S(x)$, generally referred to as n(x)) may be in accordance with the equation:

$$n(x) = \min\left(n(x), B'(x) + \min\left(n\left(x - \begin{bmatrix} 1 \\ 0 \end{bmatrix}\right), n\left(x - \begin{bmatrix} 0 \\ 1 \end{bmatrix}\right)\right)\right). \quad (13)$$

A reverse filtering operation (starting at the final image region, x=N) can then be performed by the blend filtering logic 224 on each of the initial blending masks, n(x), in accordance with the equation:

$$n(x) = \min\left(n(x), B'(x) + \min\left(n\left(x + \begin{bmatrix} 1 \\ 0 \end{bmatrix}\right), n\left(x + \begin{bmatrix} 0 \\ 1 \end{bmatrix}\right)\right)\right). \quad (14)$$

In this way, the initial blending mask $n_L(x)$ shown in FIG. 8b with line $804_b$ is smoothed to form a smoothed blending mask shown by the dashed line $804_{sm}$. Similarly, the initial blending mask $n_S(x)$ shown in FIG. 8c with line $806_b$ is smoothed to form a smoothed blending mask shown by the dashed line $806_{sm}$. The smoothed blending masks shown by the dashed lines $804_{sm}$ and $806_{sm}$ step to a value of 1 at positions $x_3$ and $x_2$ respectively. This is due to the modification to the filter costs such that $B'(x_2)=B'(x_3)=1$. The forward filtering operation processes the image in increasing order of coordinates and the reverse filtering operation processes the image in decreasing order of coordinates. This may be a raster scan order, but more generally this may be any order that ensures one or more neighbouring input pixels have been processed before a current pixel. Multiple filters may be implemented in the blend filtering logic 224 and the filters may be separated so that only one direction is processed per filter, e.g. horizontal forward and backward, or vertical forward and backward. The order of the passes has negligible impact on the result. Using separate filters may be beneficial for certain implementations. For example, a GPU may efficiently process many samples in parallel using separated filters.

In preferred examples, both the forward and reverse filter passes are applied twice for each of the initial blending masks, to ensure that the blending can propagate around corners. Using two repetitions might not be enough for the masks to completely converge to a stable result, but the difference between the smoothed blending masks and the completely converged blending masks becomes visually insignificant after two repetitions, so this is sufficient.

In step S324 the image blending mask determining logic 226 determines image blending factors $\alpha(x)$ of an image blending mask based on the smoothed blending masks $n_L(x)$ and $n_S(x)$. In examples described herein, the image blending factors are in a range from 0 to 1, i.e. $0 \leq \alpha(x) \leq 1$. The image blending factors $\alpha(x)$ for inclusion in the image blending mask are determined based on the smoothed blending masks such that the image blending factors $\alpha(x)$ are either zero or one for image regions which have either the saturated type or the motion type. This means that no blending of the input images ($I_L$ and $I_S$) is performed for image regions having either the saturated type or the motion type. This can be seen in FIG. 8d which shows the image blending factors $\alpha(x)$ with the line 808. It can be seen that in saturated image regions (e.g. between $x_1$ and $x_2$ and between $x_7$ and $x_8$) the image blending factors $\alpha(x)$ have a value of zero, and in motion image regions (e.g. between $x_3$ and $x_4$) the image blending factors $\alpha(x)$ have a value of one. In image regions which are neither saturated nor motion regions (e.g. between $x_4$ and $x_6$), the image blending factors $\alpha(x)$ preferably have a value of one, but only if this is possible without causing sharp transitions. Transitions in the image blending factors $\alpha(x)$ are smooth, i.e. the image blending factors $\alpha(x)$ have finite first order derivatives.

The image blending factors $\alpha(x)$ may be determined according to the equation:

$$\alpha(x) = \max\left(n_L(x), \frac{n_L(x)}{n_L(x) + n_S(x)}\right). \quad (15)$$

According to equation 15, the image blending factors $\alpha(x)$ follow the smoothed blending factors $n_L(x)$ unless a motion region is close to a saturated region, such that a transition in the image blending factors $\alpha(x)$ has to occur more quickly than in the smoothed blending factors $n_L(x)$. For example, in the region between $x_2$ and $x_3$ the image blending factors $\alpha(x)$ transition from 0 to 1 at a faster rate than the smoothed blending factors $n_L(x)$ (which have to step to a value of 1 at $x_3$, to avoid encroaching into the motion region). In the region between $x_2$ and $x_3$, $$n_L(x) < \frac{n_L(x)}{n_L(x) + n_S(x)},$$

so the image blending factors α(x) take values of $$\frac{n_L(x)}{n_L(x) + n_S(x)}$$

to ensure that the transition of α(x) is smooth and does not extend into the saturated region (between $x_1$ and $x_2$) or into the motion region (between $x_3$ and $x_3$). In other regions (e.g. between $x_0$ and $x_2$ and between $x_3$ and $x_8$)

$$n_L(x) \geq \frac{n_L(x)}{n_L(x) + n_S(x)},$$

so the image blending factors take values of the smoothed blending factors $n_L(x)$. For example, the motion region (between $x_3$ and $x_4$) is not close to the saturated region (between $x_7$ and $x_8$), so the smoothed blending mask $n_S(x)$ can transition from 0 (at $x_4$) to 1 (at $x_{75}$) due to the blending filtering logic 224 before the point ($x_6$) at which the smoothed blending mask $n_L(x)$ starts to transition from 1 (at $x_6$) to 0 (at $x_7$). Therefore, in these image regions the image blending factors α(x) can simply take values of the smoothed blending factors $n_L(x)$.

The image blending mask α(x) is passed to the image blending logic 228 which also receives the input images $I_S$ and $I_L$. The image blending mask is used to blend the input images ($I_S$ and $I_L$) to form a blended image ($I_R$).

In particular, in step S326 the image blending logic 228 upsamples the image blending mask α(x), e.g. by interpolation by a factor of 2, so that it is at the same resolution as the input images ($I_S$ and $I_L$). Then in step S328 the image blending logic 228 uses the image blending factors of the upsampled image blending mask α(x) to determine weights for use in a weighted sum of the images ($I_S$ and $I_L$). The weights for the images $I_L(x)$ and $I_S(x)$ are α(x) and (1−α(x)) respectively. Therefore, the blended image ($I_R$) may be determined according to the equation:

$$I_R(x) = \alpha(x)I_L(x) + (1-\alpha(x))I_S(x). \tag{16}$$

As described above, the input images $I_S$ and $I_L$ may have different exposure levels (which may be captured at different time instances) and the blended image $I_R$ may be a HDR image. In some examples, there may be more than two images which are to be blended to form the HDR image, wherein the images are iteratively combined pairwise, in an order according to the exposure levels of the images, such that a blended image (a "reference image") resulting from blending two of the images in a first iteration is blended with another one of the images in a subsequent iteration.

For example, if the images are processed in decreasing order of exposure value, then the first two images can be combined to form a reference image which is assigned the exposure value of the shorter of the two exposures, and then the reference image is blended with another one of the images, and so on until a final blended HDR image is formed. If images are being processed in increasing order of exposure value, then the reference image is assigned the exposure value of the longer of the two exposures used to form the reference image.

Therefore, if more than two images are to be combined the images are processed in monotonic order of exposure level (e.g. in monotonic order of (exposure time)×(sensitivity)), so that it is simple to determine which of the reference image and new image is the longer and the shorter exposure.

The first image is used as the initial reference image and defines the reference coordinate space. Each new image in turn is geometrically and radiometrically aligned with the reference image and blended with it, to produce an updated reference image. Inconsistencies between the new image and the reference image are concealed by modifying the alpha masks so that inconsistent regions are sampled from one image only. A sequential processing pipeline may be chosen to avoid the need to have all images in memory at once.

The blended, HDR image ($I_R$) is outputted from the HDR processing unit 106 and may be provided back to the image processing unit 104 which may perform further processing on the image in order to determine a processed image. The processed image may be used for any suitable purpose, e.g. displayed on a display, transmitted to another device or stored in memory 108, etc.

In the examples described above, two or more images are combined to form a blended HDR image for use in High Dynamic Range image processing. More generally, the above methods could be used for combining images for any suitable purpose where it may be beneficial to apply filtering operations which use filter costs which are indicative of image gradients in the images. For example, a plurality of images having different focussing may be combined in accordance with the examples described herein. The plurality of images may be captured in series with focus settings being set differently for the capture of each image, although the exposure levels may be the same for each of the images. It is noted that if the images are captured in series (i.e. a different times) then there may be motion between the different images, similarly to as described above in relation to the capture of different images for use in forming an HDR image. In the example of a plurality of images having different focussing, different image regions may be in better focus in different images, and the images can be combined to form a blended image in which the better focussed image regions are preferentially chosen from the images. Transitions between image regions taken from different images can be smoothed in accordance with filter costs which are dependent upon image gradients in the images. For example, similarly to as described above, the filter costs may be used in filtering operations, e.g. (i) in a connectivity filtering operation for determining connected image regions which are taken from the same image (noting that, as described above, for image regions where motion is present, a single image should be used to form the blended image to avoid motion artefacts), and/or (ii) in a blending filtering operation for blending two or more images together to form a blended image, such that transitions between images used to form the blended image are smoothed.

In other examples, the filtering principles of the methods described above could be used for purposes other than combining images. For example, filtering operations which use filter costs which are indicative of image gradients in the images could be useful for filtering a single image. For example, the filtering operations may be used to apply de-noising to an image such that the extent of the de-noising applied to an image region is dependent upon the filter cost for the image region. This can be useful because the extent to which the filtering is noticeable may be dependent upon the image gradients in the image. For example, the de-noising filtering may be more apparent in highly detailed image regions and less apparent in less detailed image regions, so the amount of de-noising may be increased for image regions with high levels of detail compared to image regions with lower levels of detail.

Figure 9:
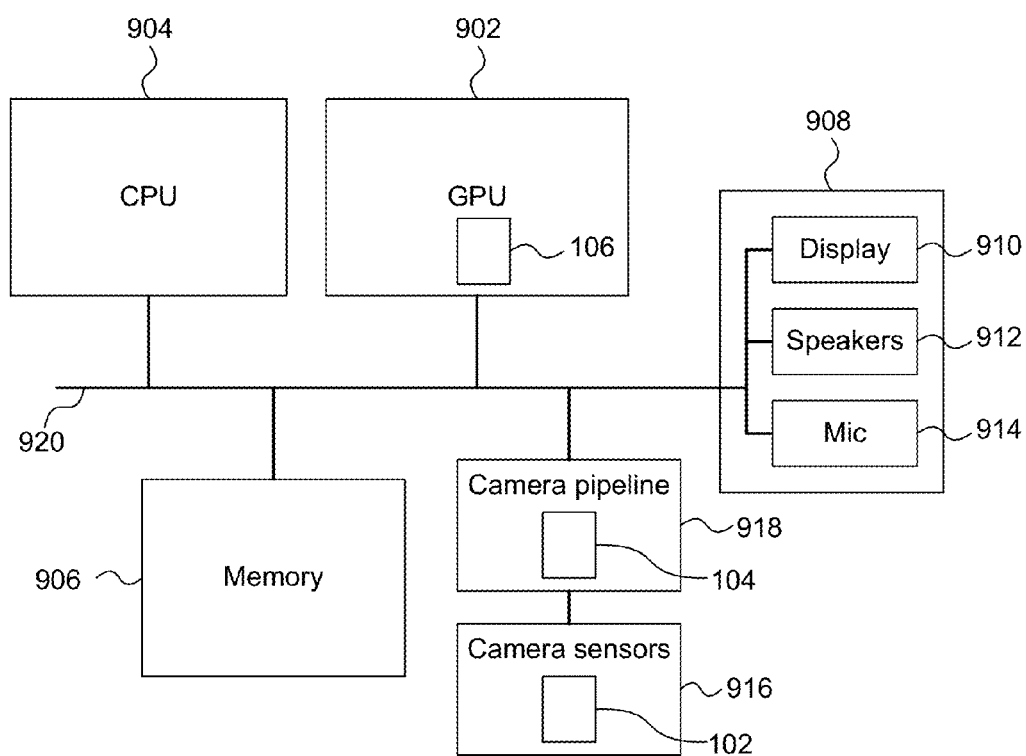
FIG. 9 is a schematic diagram of a computer system in which a HDR processing unit is implemented.

FIG. 9 shows a computer system in which the HDR processing unit 106 may be implemented. The computer system comprises a GPU 902, a CPU 904, a memory 906 and other devices 908, such as a display 910, speakers 912 and a microphone 914. The computer system may also comprise camera sensors 916 which includes the sensor array 102 and a camera pipeline which includes the image processing unit 104. As described above, the HDR processing unit 106 may be implemented on the GPU 902. The components of the computer system can communicate with each other via a communications bus 920. The HDR processing unit 106 may be implemented (e.g. in hardware) as part of the GPU 902 as shown in FIG. 9. Alternatively, the HDR processing unit 106 may be implemented on the CPU 904. If the HDR processing unit 106 is implemented in software then it may be stored as computer program code in the memory 906 and may be executed on a processing unit in the computer system (e.g. on the GPU 902 or the CPU 904).

Generally, any of the functions, methods, techniques or components described above (e.g. the HDR processing unit 106 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, block, unit or logic represents non-transitory executable program code that performs specified tasks when executed on a processor (e.g. one or more CPUs or GPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program embodied in a non-transitory computer readable storage medium comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, block, unit or logic (e.g. the HDR processing unit 106 and its components) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, block, unit or logic (e.g. the HDR processing unit 106 and its components) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, block, unit or logic described above, such as HDL (hardware description language) software, as is used for designing integrated circuits, or for configuring programmable chips, to carry out desired functions. That is, there may be provided a computer readable storage medium having encoded thereon computer readable program code for generating an image processing system configured to perform any of the methods described herein, or for generating an image processing system comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate an image processing system as described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:
1. An image processing method comprising:
 determining image gradient indications for at least two images;

determining filter costs for image regions based on the determined image gradient indications for the at least two images; and applying a filtering operation to images with filter logic using the determined filter costs for the image regions, so that the filtering is performed for image regions in dependence upon image gradients of the images.

2. An image processing system comprising:

gradient determining logic configured to determine image gradient indications for at least two images;

filter cost determining logic configured to determine filter costs for image regions based on the determined image gradient indications for the at least two images; and processing logic configured to process data relating to images, the processing logic comprising filtering logic configured to apply a filtering operation using the determined filter costs for image regions of the images, so that the processing logic is configured to perform processing for image regions in dependence upon image gradients of the images.

3. The image processing system of claim 2 wherein the filtering logic is configured to apply a recursive filtering operation to determine a respective cumulative cost for each of a plurality of the image regions by finding the lowest cumulative cost along a path from the image region to an image region of interest.

4. The image processing system of claim 3 wherein the filtering logic is configured to perform the recursive filtering operation in a forward direction and in a reverse direction.

5. The image processing system of claim 2 wherein the filter cost determining logic is configured to determine a filter cost for an image region by:

determining a minimum gradient indication for the image region from the plurality of images;

multiplying the determined minimum gradient indication by a multiplication factor; and adding an offset to the result of the multiplication.

6. The image processing system of claim 2 further comprising:

type mask determining logic configured to determine a type mask which includes type indicators for image regions to thereby categorise each of the image regions into one of a plurality of types;

wherein said processing logic comprises a connectivity unit which includes the filtering logic and which is configured to, for each of a plurality of the image regions, use the filtering operation to determine the lowest cumulative cost along a path from the image region to an image region of a particular type according to the type indicators, and selectively set the type indicator for the image region to indicate the particular type in dependence on a comparison of the determined lowest cumulative cost with a threshold.

7. The image processing system of claim 6 wherein the connectivity unit is configured to selectively set the type indicator for the image region to indicate the particular type in dependence on the type indicator of the image region.

8. The image processing system of claim 6 wherein there are three types: (i) a saturated type, (ii) a motion type, and (iii) a null type.

9. The image processing system of claim 6 wherein the connectivity unit is further configured to implement a union-find procedure to selectively set the type indicators to indicate the particular type for image regions which have another type and which are connected to an image region having the particular type.

10. The image processing system of claim 2 wherein at least one initial blending mask indicates initial blending factors for use in combining the at least two images, wherein said processing logic comprises a blending unit which includes the filtering logic and which is configured to:

smooth transitions in the at least one initial blending mask at smoothing rates in accordance with the filter costs for the image regions at the respective transitions.

11. The image processing system of claim 10 wherein the initial blending factors are binary blending factors and wherein the blending unit comprises initial blending mask determining logic configured to determine the initial blending factors of the at least one initial blending mask for the image regions based on type indicators from a type mask for the image regions.

12. The image processing system of claim 11 wherein the initial blending mask determining logic is configured to determine two initial blending masks, such that: (i) a first of the initial blending masks includes binary blending factors to indicate whether or not the corresponding type indicators are a first type, and (ii) a second of the initial blending masks includes binary blending factors to indicate whether or not the corresponding type indicators are a second type.

13. The image processing system of claim 10 wherein the blending unit comprises:

image blending mask determining logic configured to determine an image blending mask based on the at least one smoothed blending mask; and image blending logic configured to use the image blending mask to blend the at least two images to form a blended image.

14. The image processing system of claim 13 wherein the image blending logic is configured to use image blending factors of the image blending mask to determine weights for use in a weighted sum of the at least two images.

15. The image processing system of claim 13 wherein the image blending mask determining logic is configured to determine image blending factors for inclusion in the image blending mask based on the first and second smoothed blending masks such that the image blending factors are either zero or one for image regions which have either the first type or the second type, such that the image blending logic does not perform blending of the plurality of images for image regions having either the first type or the second type.

16. The image processing system of claim 15 wherein the image blending mask determining logic is configured to determine the image blending factors such that they vary smoothly in the image blending mask.

17. The image processing system of claim 2, wherein said system is used in a High Dynamic Range image processing system wherein said at least two images comprises a particular image and another image, wherein the particular image has a higher exposure level than the other image.

18. The image processing system of claim 17 wherein said at least two images comprises more than two images having different exposure levels, and wherein the image processing system is configured to process the images iteratively in a pairwise manner in an order according to the exposure levels of the images, such that the image processing system is configured to determine a blended image by blending two of the images in a first iteration, and then in a subsequent iteration to blend the blended image resulting from the first iteration with another one of the images.

19. A non-transitory computer readable storage medium having stored thereon computer executable instructions that when executed cause at least one processor to:
   determine image gradient indications for at least two images;
   determine filter costs for image regions based on the determined image gradient indications for the at least two images; and
   process data relating to images including applying a filtering operation using the determined filter costs for the image regions of the images, so that the processing is performed for image regions in dependence upon image gradients of the images.

20. A non-transitory computer readable storage medium having stored thereon a computer readable dataset description of an integrated circuit that when processed, causes a layout processing system to generate a circuit layout description used to manufacture an image processing system, comprising:
   gradient determining logic configured to determine image gradient indications for at least two images;
   filter cost determining logic configured to determine filter costs for image regions based on the determined image gradient indications for the at least two images; and
   processing logic configured to process data relating to images, the processing logic comprising filtering logic configured to apply a filtering operation using the determined filter costs for image regions of the images, so that the processing logic is configured to perform processing for image regions in dependence upon image gradients of the images.

* * * * *